US008825110B2

(12) United States Patent  
Esch et al.

(10) Patent No.: US 8,825,110 B2  
(45) Date of Patent: Sep. 2, 2014

(54) METHOD FOR RECEIVING SYNCHRONIZATION SIGNALS OF A MOBILE RADIO NETWORK AND TRANSMITTING/RECEIVING DEVICE FOR MOBILE RADIO SIGNALS

(75) Inventors: Michael Esch, Nuremberg (DE); Wolfgang Wippich, Hersbruck (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 13/172,891

(22) Filed: Jun. 30, 2011

(65) Prior Publication Data

US 2012/0004013 A1    Jan. 5, 2012

Related U.S. Application Data

(60) Provisional application No. 61/360,527, filed on Jul. 1, 2010.

(30) Foreign Application Priority Data

Jul. 1, 2010   (DE) .................. 10 2010 025 796

(51) Int. Cl.
| | | |
|---|---|---|
| *H04M 1/00* | (2006.01) | |
| *H04W 36/00* | (2009.01) | |
| *H04W 8/18* | (2009.01) | |
| *H04W 88/06* | (2009.01) | |

(52) U.S. Cl.
CPC .......... *H04W 36/0088* (2013.01); *H04W 8/183* (2013.01); *H04W 88/06* (2013.01)
USPC ........ 455/552.1; 455/502; 455/524; 370/342; 370/347

(58) Field of Classification Search
USPC ............. 455/552.1, 425, 552, 558, 41.1, 502, 455/436; 370/342, 347, 318, 350, 351
See application file for complete search history.

(56) References Cited

U.S. PATENT DOCUMENTS

| | | | |
|---|---|---|---|
| 6,584,116 B1 | 6/2003 | Gourgue et al. | |
| 6,788,952 B1 | 9/2004 | Jokimies et al. | |
| 7,702,343 B2 | 4/2010 | Manohar | |
| 2003/0036354 A1* | 2/2003 | Lee et al. .................. | 455/41 |

(Continued)

FOREIGN PATENT DOCUMENTS

| | | |
|---|---|---|
| JP | 2002501356 A | 1/2002 |
| JP | 2002-218536 A | 8/2002 |

(Continued)

OTHER PUBLICATIONS

Office Action received for Japanese patent Application No. 2011-147658, mailed on Jul. 30, 2013, 5 pages of Office action including 3 pages of English Translation.

(Continued)

*Primary Examiner* — Mahendra Patel

(57) ABSTRACT

In various embodiments, a method for receiving synchronization signals of a mobile radio network is provided. The method may include communicating, by using a transmitting/receiving device for mobile radio signals, with a mobile radio network via a dedicated communication link; and receiving, by using the transmitting/receiving device, synchronization signals of another mobile radio network during a transmission gap in the dedicated communication link, the transmitting/receiving device not being set up for receiving signals of the other mobile radio network independently of the dedicated communication link.

17 Claims, 3 Drawing Sheets

(56) References Cited

U.S. PATENT DOCUMENTS

| | | | |
|---|---|---|---|
| 2003/0087654 A1* | 5/2003 | Wheeler | 455/502 |
| 2004/0223483 A1* | 11/2004 | Cooper | 370/347 |
| 2006/0172772 A1* | 8/2006 | Bjorkner | 455/558 |
| 2008/0081609 A1* | 4/2008 | Burgan et al. | 455/425 |
| 2009/0088160 A1* | 4/2009 | Pani et al. | 455/436 |
| 2010/0165970 A1* | 7/2010 | Lee | 370/342 |

FOREIGN PATENT DOCUMENTS

| | | |
|---|---|---|
| JP | 2002-345046 A | 11/2002 |
| JP | 2003-189361 A | 7/2003 |
| JP | 2008-535445 A | 8/2008 |
| JP | 200955325 A | 3/2009 |
| KR | 100964133 B1 | 6/2010 |

OTHER PUBLICATIONS

Office Action received for Chinese Patent Application No. 201110227925.6, mailed on Nov. 6, 2013, 7 pages of English Translation only.

English language abstract of JP 200955325A of Mar. 12, 2009.

* cited by examiner

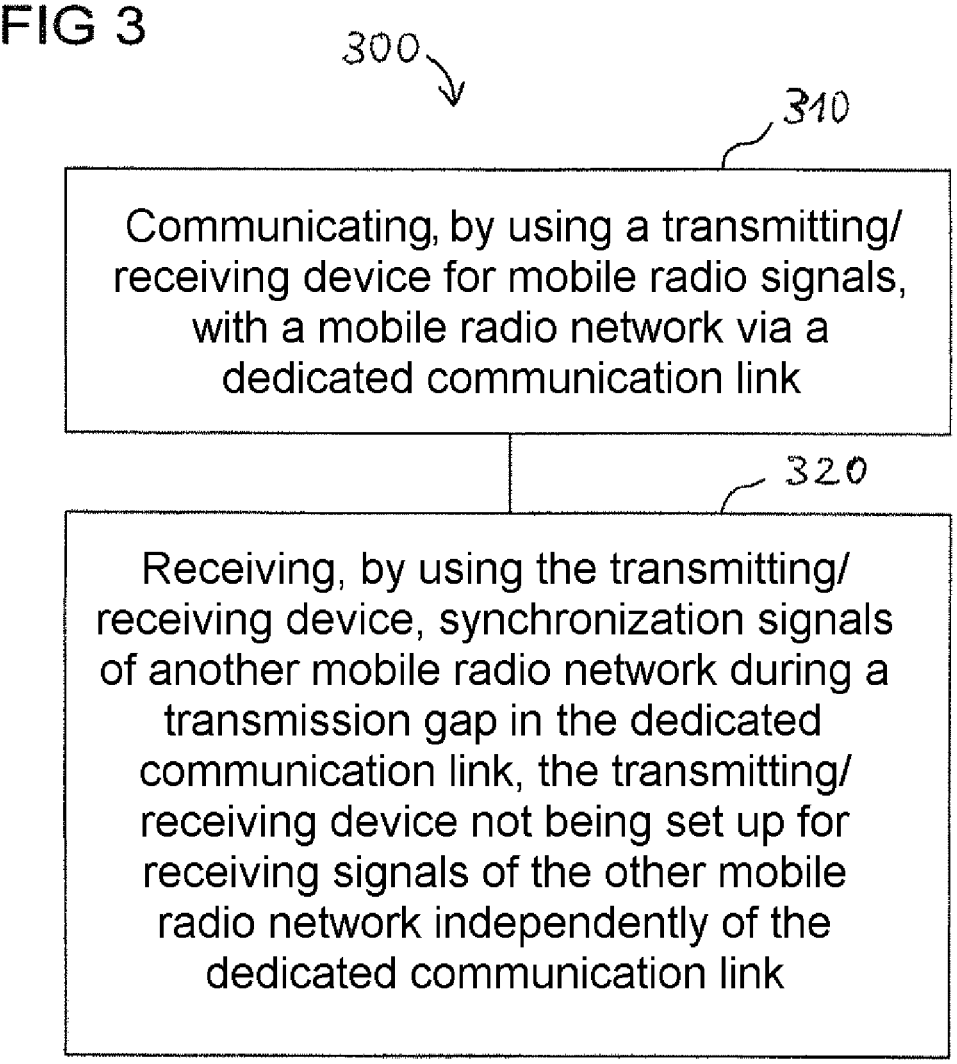

METHOD FOR RECEIVING SYNCHRONIZATION SIGNALS OF A MOBILE RADIO NETWORK AND TRANSMITTING/RECEIVING DEVICE FOR MOBILE RADIO SIGNALS

CROSS-REFERENCE TO RELATED APPLICATION

This application claims priority to U.S. Provisional Patent Application Ser. No. 61/360,527, which was filed Jul. 1, 2010, and also German Patent Application Serial No. 102010025796.6, which was filed Jul. 1, 2010 is incorporated herein by reference in their entirety.

TECHNICAL FIELD

Various embodiments relate to a method for receiving synchronization signals of a mobile radio network and a transmitting/receiving device for mobile radio signals.

BACKGROUND

A mobile radio terminal, for example a mobile telephone, needs for its normal operation in the mobile radio network a mobile radio card, i.e. a chip card which contains a subscriber identity module (SIM) used for identifying the user in the mobile radio network and is therefore also called a SIM card.

Mobile radio terminals which are to be used simultaneously with two SIM cards need two mutually independent transmitting/receiving devices for mobile radio signals or, respectively, a transmitting/receiving device with a dual construction of the components needed for parallel data paths to be operated independently of one another, in order to provide for a simultaneous, independent operation of the two SIM cards in their respectively associated mobile radio networks.

Mobile radio terminals having only a single transmitting/receiving device for mobile radio signals which are to be used simultaneously with two SIM cards allow only an alternative operation of the SIM cards, i.e. with these, the user of the device has to switch back and forth between the two SIM cards and their respectively associated mobile radio networks as required.

In a mobile radio terminal which is to be used with two SIM cards simultaneously, it would be desirable to provide for a flexible operation with rapid change between the two SIM cards and their respectively associated mobile radio networks with less expenditure than is represented by two mutually independent transmitting/receiving devices for mobile radio signals and two mutually independent data paths for mobile radio signals.

SUMMARY

In a method for receiving synchronization signals of a mobile radio network, communication with a mobile radio network takes place via a dedicated communication link, by using a transmitting/receiving device for mobile radio signals, and synchronization signals of another mobile radio network are received during a transmission gap in the dedicated communication link by using the transmitting/receiving device, the transmitting/receiving device not being set up for receiving signals of the other mobile radio network independently of the dedicated communication link.

BRIEF DESCRIPTION OF THE DRAWINGS

In the drawings, like reference characters generally refer to the same parts throughout the different views, when appropriate. The drawings are not necessarily to scale, emphasis instead generally being placed upon illustrating the principles of the invention. In the following description, various embodiments of the invention are described with reference to the following drawings, in which:

FIG. 3 shows a flowchart in which a method for receiving synchronization signals of a mobile radio network according to an embodiment of the invention is shown.

DETAILED DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Within this description, the terms "linked", "connected" and "coupled" are used for describing both a direct and an indirect linkage, a direct or indirection connection and a direct or indirect coupling.

Figure 1:
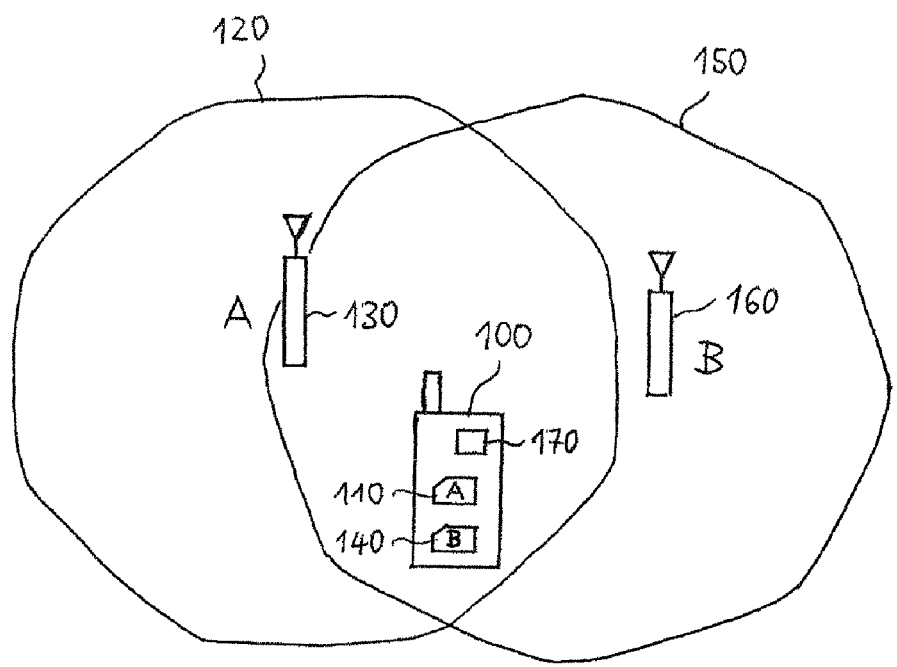
FIG. 1 shows a scenario of the simultaneous operation of a mobile radio terminal having two SIM cards in two mobile radio networks and a transmitting/receiving device for mobile radio signals and a mobile radio terminal according to embodiments of the invention.

FIG. 1 shows initially a scenario of the simultaneous operation of a mobile radio terminal with two SIM cards in two mobile radio networks.

The mobile radio terminal 100, for example a mobile telephone, is to be operated in the mobile radio network 1 with a subscriber identity module (SIM) which is contained in the SIM card (mobile radio card) A 110. The mobile radio network 1 is represented in FIG. 1 by the radio cell A 120, which is supplied by the base station A 130.

Furthermore, the mobile radio terminal 100 is to be operated in the mobile radio network 2 with a subscriber identity module which is contained in the SIM card (mobile radio card) B 140. The mobile radio network 2 is represented in FIG. 1 by the radio cell B 150, which is supplied by the base station B 160.

In this context, the technical problem arises that cellular terminals having only one transmitting/receiving unit, which are to be operated with several SIM cards simultaneously, do not receive any signals from the network of the other SIM card during a dedicated link (e.g. call mode) of the one SIM card. This can be illustratively visualized in such a manner that the single transmitting/receiving unit available in the terminal must be allocated to the dedicated link.

As a result, the synchronization with the other network is lost and it is not possible to set up a connection to the network of the other SIM card immediately after terminating the dedicated link. Once the dedicated link has been terminated, the network of the other SIM card must be synchronized again in the time and frequency domain as a result of which the terminal cannot be reached on this network during this time either. This time interval is typically between 50 milliseconds and several seconds for the mobile radio standard according to the "Global System for Mobile Communications" (GSM).

According to one embodiment of the invention, a method is provided for keeping a number of received radio cells of various mobile radio networks synchronized during a dedicated data or voice link via a mobile radio network when operating a number of SIM cards with a single baseband unit and a single radio-frequency transceiver (transmitter/receiver).

According to one embodiment of the invention, communication with a mobile radio network takes place via a dedicated communication link in a method for receiving synchronization signals of a mobile radio network, by using a transmitting/receiving device for mobile radio signals, and synchronization signals of another mobile radio network are received during a transmission gap in the dedicated communication link by using the transmitting/receiving device, the transmitting/receiving device not being set up for receiving signals of the other mobile radio network independently of the dedicated communication link.

According to an embodiment, a transmitting/receiving device for mobile radio signals is set up for communicating with a mobile radio network via a dedicated communication link. It is also set up for receiving synchronization signals of another mobile radio network during a transmission gap in the dedicated communication link. In this arrangement, the transmitting/receiving device is not set up for receiving signals of the other mobile radio network independently of the dedicated communication link. The transmitting/receiving device 170 of the mobile radio terminal 100 is such a transmitting/receiving device.

According to one embodiment of the invention, a mobile radio terminal has a transmitting/receiving device set up in accordance with an embodiment. The mobile radio terminal 100 is such a mobile radio terminal.

Figure 2:
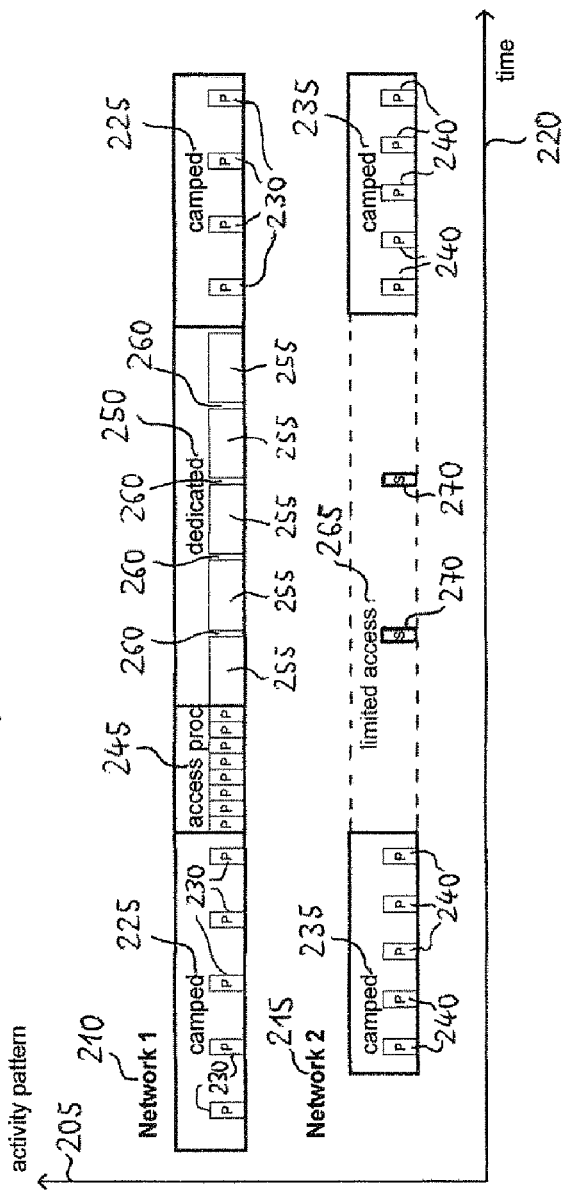
FIG. 2 shows a diagram in which the variation with time of an activity pattern in a method according to an embodiment of the invention is shown.

FIG. 2 shows a diagram 200 in which the variation with time of an activity pattern with a method according to various embodiments is shown.

Along the "activity pattern" axis 205, activities of the transmitting/receiving device 170 (see FIG. 1) are plotted, namely in the case of "Network 1" 210 those with respect to the mobile radio network 1 or its radio cell A 120 (see FIG. 1) and in the case of "Network 2" 215 those with respect to the mobile radio network 2 or its radio cell B 150 (see FIG. 1). The "time" axis 220 is the time axis for the variation with time of the respective activities.

In the "camped" areas 225, "paging messages" or signals of a pilot channel "P" 230 of the mobile radio network 1 are received, interrupted by relatively large gaps. In the "camped" areas 235, "paging messages" or signals of a pilot channel "P" 240 of the mobile radio network 2 are received, interrupted by relatively large gaps. The term "camped" relates to the technical term "camped on a cell" which means registered in a radio cell but without dedicated bidirectional communication link.

In the "access proc(edure)" area 245, a dedicated bidirectional communication link to the mobile radio network 1 is set up.

In the "dedicated" area 250, there is a dedicated bidirectional communication link to the mobile radio network 1 or the radio cell A 120, respectively (see FIG. 1). During the duration of the dedicated link, data are exchanged between the transmitting/receiving device 170 and the radio cell A 120 (see FIG. 1) in the time phases 255.

From the point of view of the mobile radio network 1, the transmission gaps 260 between the time phases 255 are provided for example for carrying out measuring jobs issued by the network to the mobile radio terminal 100 (see FIG. 1) and the results of which have to be reported to the mobile radio network 1 by the mobile radio terminal 100.

According to one embodiment of the invention, synchronization signals of the other network are received during transmission gaps of the dedicated link. By this means, the synchronization information of the other network is updated if the corresponding cells can still be received. This has the further effect that the mobile radio terminal can be reached again in the other network immediately after the dedicated link to the one network has ended, or can itself access the other network.

In the "limited access" area 265, synchronization information of the mobile radio network 2 is received in short time intervals "S" 270 which correspond to the transmission gaps 260 in the dedicated link to the mobile radio network 1 or are contained in time in the transmission gaps 260. The time intervals "S" 270 are shorter than the transmission gaps 260 or of equal length to the transmission gaps 260. They are located within the transmission gaps 260 in time. It must be noted that these temporal relations between the transmission gaps 260 and the time intervals "S" 270 are shown only diagrammatically in FIG. 2.

According to one embodiment, the receiving of synchronization signals includes a receiving independent of measuring jobs of the mobile radio network, i.e. the synchronization signals of the other mobile radio network are received independently of any measuring job of the one mobile radio network, i.e. especially not on the basis of a request or job allocation by a measuring job in connection with which a corresponding transmission gap has been configured.

According to one embodiment, the transmission gap is configured for a measuring job of the mobile radio network and synchronization signals are received while the measuring job is not being executed.

According to one embodiment, receiving of synchronization signals does not take place as part of a handover process for handing over the dedicated communication link from the mobile radio network to the other mobile radio network. For example, the mobile radio network 1 has not issued a measuring order relating to the mobile radio network 2 nor is the dedicated communication link existing to the mobile radio network 1 to be transferred to the mobile radio network 2.

According to an embodiment of the invention, the dedicated communication link is ended and subsequently another dedicated communication link, independent of the dedicated communication link, is established to the other mobile radio network on the basis of the received synchronization signals (during the dedicated link).

According to embodiments, the invention can be used in connection with various mobile radio standards (for example cellular standards), for example in connection with the standards for "Global System for Mobile Communications" (GSM), "Universal Mobile Telecommunications System" (UMTS) or "Long Term Evolution" (LTE).

According to one embodiment, the transmission gaps are "search frames" according to the mobile radio standard for GSM.

According to one embodiment, the transmission gaps are "compressed mode gaps" according to the mobile radio standard for UMTS.

According to one embodiment, the invention can be used with "multi-mode" terminals, i.e. those terminals which simultaneously support a number of cellular standards, wherein, during a dedicated link in a network which uses a cellular standard, the cells of another network which uses another cellular standard are kept synchronized. This is designated by the technical term "inter RAT", i.e. it is a synchronization occurring between various "radio access technology" (RAT).

According to one embodiment, detection and synchronization of previously unobserved cells of another network takes place during a dedicated link in a first network. For this purpose, messages with system information are also received in addition to the synchronization signals of the other network. According to one embodiment, receiving, by using the transmitting/receiving device, of system information messages or of temporal sections of system information messages of the other mobile radio network takes place during the transmission gap in the dedicated communication link.

According to one embodiment of the invention, receiving of synchronization signals and/or of system information messages of the other network takes place during time intervals which were (originally) provided for transmitting data on the first network.

According to one embodiment, the synchronization of neighboring cells of the other mobile radio network is maintained for the mobile case, i.e. if the transmitting/receiving device is moving. In this case, visible neighboring cells, as seen from the point of view of the transmitting/receiving device, can "disappear" again and "re-emerge". According to one embodiment, a search for possible neighboring cells is performed, for example for those neighboring cells which were previously not as yet known, i.e. which have previously not yet been signaled via a neighbor-cell list of the other network.

According to one embodiment of the invention, an authorization information item is sent, which is stored on a mobile radio card, to the mobile radio network and another authorization information item is sent, which is stored on another mobile radio card, to the other mobile radio network.

According to one embodiment of the invention, the mobile radio network is allocated to one network operator and the other mobile radio network is allocated to another network operator.

FIG. 3 shows a flowchart 300 in which a method for receiving synchronization signals of a mobile radio network according to an embodiment of the invention is shown. The embodiment shown in FIG. 3 can be combined with all other embodiments of the method described.

In 310, communication takes place, by using a transmitting/receiving device for mobile radio signals, with a mobile radio network via a dedicated communication link.

In 320, reception takes place, by using the transmitting/receiving device, of synchronization signals of another mobile radio network during a transmission gap in the dedicated communication link, the transmitting/receiving device not being set up for receiving signals of the other mobile radio network independently of the dedicated communication link.

According to another embodiment, all embodiments defined by one of the patent claims can be combined with one or more other embodiments which are defined by one or more respective other patent claims.

In various embodiments, in a method for receiving synchronization signals of a mobile radio network, communication with a mobile radio network takes place via a dedicated communication link, by using a transmitting/receiving device for mobile radio signals, and synchronization signals of another mobile radio network are received during a transmission gap in the dedicated communication link by using the transmitting/receiving device, the transmitting/receiving device not being set up for receiving signals of the other mobile radio network independently of the dedicated communication link.

In various embodiments, a transmitting/receiving device for mobile radio signals is configured to communicate with a mobile radio network via a dedicated communication link. It is also configured to receive synchronization signals of another mobile radio network during a transmission gap in the dedicated communication link. In this arrangement, the transmitting/receiving device is not configured to receive signals of the other mobile radio network independently of the dedicated communication link.

One aspect of the invention can be illustratively seen in that relatively short transmission gaps, in which no data transmission of the dedicated communication link to the one mobile radio network takes place, are used for using the transmitting/receiving device, temporarily not needed for transmitting data in the dedicated communication link during such transmission gaps, for receiving synchronization signals of another mobile radio network instead.

Various embodiments may have the advantageous effect that synchronization information of another mobile radio network can be received or updated during a dedicated communication link to the one mobile radio network and thus a link can be established to the other mobile radio network directly, i.e. without delay by a previously still necessary synchronization, after the dedicated communication link has ended. This provides for a flexible operation with rapid change between two SIM cards and their respectively associated mobile radio networks by using a signal transmitting/receiving device.

In various embodiments, the explanations relating to the methods also apply correspondingly to the devices and conversely, where applicable.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for receiving synchronization signals of a mobile radio network, the method comprising:
    sending an authorization information based on information stored on a first subscriber identity module (SIM), by using a transmitting/receiving device, to a first mobile radio network, and
    sending a second authorization information based on information stored on a second SIM, by using the transmitting/receiving device, to a second mobile radio network;
    communicating, by using the transmitting/receiving device for mobile radio signals, with the first mobile radio network via a dedicated communication link;
    receiving, by using the transmitting/receiving device, synchronization signals of the second mobile radio network during a transmission gap in the dedicated communication link, the transmitting/receiving device configured to receive signals of the second mobile radio network dependent upon the dedicated communication link;
    terminating the dedicated communication link; and
    establishing, after the terminating, another dedicated communication link, independent of the dedicated communication link, to the second mobile radio network based on the received synchronization signals.

2. The method as claimed in claim 1,
    wherein the receiving comprises a receiving independent of measuring jobs of the first mobile radio network.

3. The method as claimed in claim 2,
    wherein the transmission gap is configured for a measuring job of the first mobile radio network.

4. The method as claimed in claim 1,
wherein the receiving comprises receiving outside a handover process for handing over the dedicated communication link from the first mobile radio network to the second mobile radio network.

5. The method as claimed in claim 1, further comprising:
receiving, by using the transmitting/receiving device, a system information message of the second mobile radio network during the transmission gap in the dedicated communication link.

6. The method as claimed in claim 1,
wherein the first mobile radio network is allocated to a first network operator and the second mobile radio network being allocated to a second network operator.

7. A transmitting/receiving device for mobile radio signals, configured to send an authorization information based on information stored on a first SIM, to a first mobile radio network and send a second authorization information based on information stored on a second SIM, to a second mobile radio network; configured to communicate with the first mobile radio network via a dedicated communication link;
configured to receive synchronization signals of the second mobile radio network during a transmission gap in the dedicated communication link, the transmitting/receiving device is configured to receive signals of the second mobile radio network dependent upon the dedicated communication link; and,
configured to terminate the dedicated communication link and establishing, after the terminating, another dedicated communication link, independent of the dedicated communication link, to the second mobile radio network based on the received synchronization signals.

8. The transmitting/receiving device as claimed in claim 7,
further comprising receiving the synchronization signals independently of a measuring job of the first mobile radio network.

9. The transmitting/receiving device as claimed in claim 7,
further comprising executing the receiving of the synchronization signals instead of the measuring object of the first mobile radio network.

10. The transmitting/receiving device as claimed in claim 7,
further comprising receiving the synchronization signals outside of a handover process for handing over the dedicated communication link from the first mobile radio network to the second mobile radio network.

11. The transmitting/receiving device as claimed in claim 7,
terminating the dedicated communication link and configured to establish, after the terminating, a second dedicated communication link, independent of the dedicated communication link, to the second mobile radio network based on the received synchronization signals.

12. The transmitting/receiving device as claimed in claim 7,
further comprising receiving system information message of the second mobile radio network during the transmission gap in the dedicated communication link.

13. A mobile radio terminal comprising:
a first SIM;
a second SIM; and
a transmitting/receiving device, the transmitting/receiving device being configured to send an authorization information based on information stored on the first SIM, to a first mobile radio network and send a second authorization information based on information stored on the second SIM, to a second mobile radio network, the transmitting/receiving device being configured to communicate with the first mobile radio network via a dedicated communication link and receive synchronization signals of the second mobile radio network during a transmission gap in the dedicated communication link, the transmitting/receiving device being configured to receive signals of the second mobile radio network dependent upon the dedicated communication link and configured to terminate the dedicated communication link, and establish, after the terminating, another dedicated communication link, independent of the dedicated communication link, to the second mobile radio network based on the received synchronization signals.

14. The method as claimed in claim 1,
wherein the first SIM is implemented by means of a first mobile radio card, and the second SIM is implemented by means of a second mobile radio card.

15. The transmitting/receiving device as claimed in claim 7,
wherein the first SIM is implemented by means of a first mobile radio card, and the second SIM is implemented by means of a second mobile radio card.

16. The mobile radio terminal as claimed in claim 13,
wherein the first SIM is implemented by means of a first mobile radio card, and the second SIM is implemented by means of a second mobile radio card.

17. A method for receiving synchronization signals of a mobile radio network, the method comprising:
authorizing based on a plurality of subscriber information for a plurality mobile radio networks stored on at least one subscriber identity module (SIM);
communicating, by using the transmitting/receiving device for mobile radio signals, with one of the plurality of mobile radio networks via a dedicated communication link;
receiving, by using the transmitting/receiving device, synchronization signals of another mobile radio network of the plurality of mobile radio networks during a transmission gap in the dedicated communication link, the transmitting/receiving device configured to receive signals of the another mobile radio network dependent upon the dedicated communication link;
terminating the dedicated communication link; and
establishing, after the terminating, another dedicated communication link, independent of the dedicated communication link, to the second mobile radio network based on the received synchronization signals.

* * * * *